US008515928B2

(12) United States Patent
Kawajiri

(10) Patent No.: US 8,515,928 B2
(45) Date of Patent: Aug. 20, 2013

(54) INFORMATION PROCESSING APPARATUS AND CONTROL METHOD

(75) Inventor: Kensuke Kawajiri, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 383 days.

(21) Appl. No.: 12/476,142

(22) Filed: Jun. 1, 2009

(65) Prior Publication Data

US 2009/0300070 A1 Dec. 3, 2009

(30) Foreign Application Priority Data

Jun. 3, 2008 (JP) ................................ 2008-145847

(51) Int. Cl.
*G06F 17/30* (2006.01)

(52) U.S. Cl.
USPC ........................................................ 707/704

(58) Field of Classification Search
None
See application file for complete search history.

(56) References Cited

U.S. PATENT DOCUMENTS

| | | | | |
|---|---|---|---|---|
| 6,408,395 B1* | 6/2002 | Sugahara et al. | ............ | 713/310 |
| 7,356,677 B1* | 4/2008 | Rafizadeh | .......................... | 713/1 |
| 7,437,438 B2* | 10/2008 | Mogul et al. | .................. | 709/223 |
| 7,461,278 B2* | 12/2008 | Togawa | ......................... | 713/320 |
| 7,551,568 B2* | 6/2009 | Jeong et al. | ..................... | 370/252 |
| 7,755,779 B2* | 7/2010 | Miura et al. | ................. | 358/1.13 |
| 7,856,526 B2* | 12/2010 | Shibayama et al. | .......... | 711/112 |
| 8,006,111 B1* | 8/2011 | Faibish et al. | .................. | 713/324 |
| 2005/0108582 A1* | 5/2005 | Fung | .............................. | 713/300 |
| 2005/0203917 A1* | 9/2005 | Freeberg et al. | ................ | 707/10 |
| 2006/0265473 A1* | 11/2006 | Muto | ............................ | 709/218 |
| 2007/0130280 A1* | 6/2007 | Park et al. | ..................... | 709/208 |
| 2007/0234077 A1* | 10/2007 | Rothman et al. | ............. | 713/300 |
| 2008/0307042 A1* | 12/2008 | Honda et al. | .................. | 709/203 |
| 2009/0244588 A1* | 10/2009 | Kuroishi et al. | ............. | 358/1.14 |
| 2010/0043066 A1* | 2/2010 | Miliefsky | ......................... | 726/9 |

FOREIGN PATENT DOCUMENTS

| | | |
|---|---|---|
| JP | 2001-093220 A | 4/2001 |
| JP | 2002-258996 A | 9/2002 |
| JP | 2003-085871 A | 3/2003 |
| JP | 2006-301749 A | 11/2006 |
| JP | 2007-086843 A | 4/2007 |

\* cited by examiner

*Primary Examiner* — Bai D. Vu

(74) *Attorney, Agent, or Firm* — Canon U.S.A., Inc. IP Division

(57) ABSTRACT

An apparatus includes a first storing unit configured to store a plurality of files, wherein power supply to the first storing unit is restricted in a first sleep mode, a second storing unit configured to store file information about the plurality of files, a receiving unit configured to receive a data acquisition request from a client apparatus, a first reading unit configured to read a file from the first storing unit in response to the receiving unit when the apparatus is in a normal operation mode, a second reading unit configured to read the file information from the second storing unit in response to the receiving unit when the apparatus is in the first sleep mode, and a transmission unit configured to transmit one of the data read by the first reading unit and the data read by the second reading unit to the client apparatus.

5 Claims, 9 Drawing Sheets

NORMAL OPERATION MODE

SLEEP MODE 1

SLEEP MODE 2

FIG. 7

| FILE NAME | TIME STAMP |
|---|---|
| File A | 2007/10/11/22:54 |
| File B | 2007/10/11/13:02 |
| File C | 2007/10/13/20:40 |

701

INFORMATION PROCESSING APPARATUS AND CONTROL METHOD

BACKGROUND OF THE INVENTION

1. Field of the Invention

The present invention relates to an information processing apparatus configured to execute sharing and synchronization of a file between a client and a server which are connected via a network, and a control method thereof.

2. Description of the Related Art

A server client system is widely used in recent years. The server client system uses a network, such as the Internet or an intranet, and connects unspecified or specified client computers (hereinafter referred to as clients) and a server computer (hereinafter referred to as a server). The server client system supplies data from a server according to a request from a client.

In the server and the client, a power management function is equipped to save useless energy consumption.

Japanese Patent Application Laid-Open No. 2006-301749 discusses the power management function, which shifts an operation of an information processing apparatus (a server or a client) to a low power consumption mode (hereinafter referred to as a sleep mode) when a predetermined condition is attained, thus reducing power consumption.

However, when the power management function shifts the operation to the sleep mode, usually, the information processing apparatus as a server becomes unable to access a hard disk drive (HDD) and thus cannot read data from the HDD according to a request from the client and supply the data. Further, the information processing apparatus cannot write data received from the client to the HDD. This problem may be solved by returning the operation mode of the server from the sleep mode or not shifting to the sleep mode. However, these methods cannot acquire an effect for reducing power consumption.

SUMMARY OF THE INVENTION

The present invention is directed to an information processing apparatus capable of continuing an operation needed for sharing a file and capable of reducing power consumption, and a control method thereof.

According to an aspect of the present invention, an information processing apparatus connectable with a client apparatus via a network includes a normal operation mode and a first sleep mode for restricting power supply to the information processing apparatus. The information processing apparatus includes a first storing unit configured to store a plurality of files, wherein the power supply to the first storing unit is restricted in the first sleep mode, a second storing unit configured to store file information about the plurality of files stored in the first storing unit, a receiving unit configured to receive a data acquisition request from the client apparatus, a first reading unit configured to read a file from the first storing unit in response to the receiving unit receiving the data acquisition request from the client apparatus when the information processing apparatus is in the normal operation mode, a second reading unit configured to read the file information from the second storing unit in response to the receiving unit receiving the data acquisition request from the client apparatus when the information processing apparatus is in the first sleep mode, and a transmission unit configured to transmit one of the data read by the first reading unit and the data read by the second reading unit to the client apparatus.

According to another aspect of the present invention, an information processing apparatus connectable with a client apparatus via a network includes a normal operation mode and a sleep mode for restricting power supply to the information processing apparatus. The information processing apparatus includes a storage unit configured to store a plurality of files, wherein the power supply to the storage unit is restricted in the first sleep mode, a random access memory, a first writing unit configured to write data transmitted from the client apparatus to the storage unit when the information processing apparatus is in the normal operation mode, and a second writing unit configured to write data transmitted from the client apparatus to the random access memory when the information processing apparatus is in the sleep mode.

According to yet another aspect of the present invention, an information processing apparatus connectable with a server apparatus, which comprises a first storing unit and a second storing unit, via a network includes a determination unit configured to determine an operating state of the server apparatus, a first transmission unit configured to transmit a request to acquire a file stored in the first storing unit to the server apparatus in a case where the determination unit determines that the server apparatus is in a normal operation mode, and a second transmission unit configured to transmit a request to acquire information about a plurality of files stored in the second storing unit to the server apparatus in a case where the determination unit determines that the server apparatus is in a first sleep mode in which the power supply to the first storing unit is restricted.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a file list stored in a random access memory (RAM) and a hard disk drive (HDD) in a server illustrated in FIG. 1.

DETAILED DESCRIPTION OF THE EMBODIMENTS

Various exemplary embodiments, features, and aspects of the invention will be described in detail below with reference to the drawings.

Figure 1:
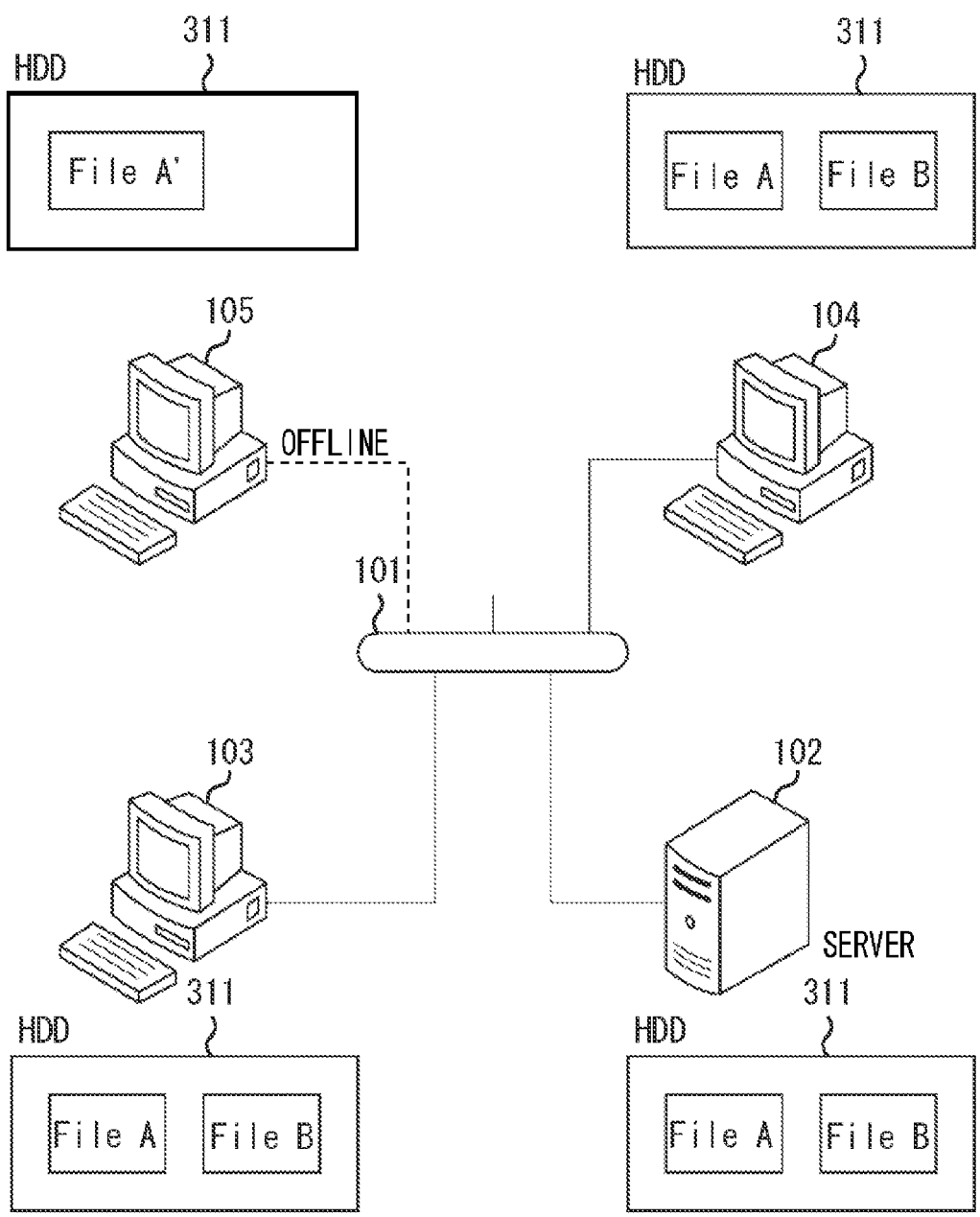
FIG. 1 is a configuration view when a client in a file sharing system (a file synchronization system) according to an exemplary embodiment of the present invention is in an offline state, where an information processing apparatus and a client are connected.
Figure 2:
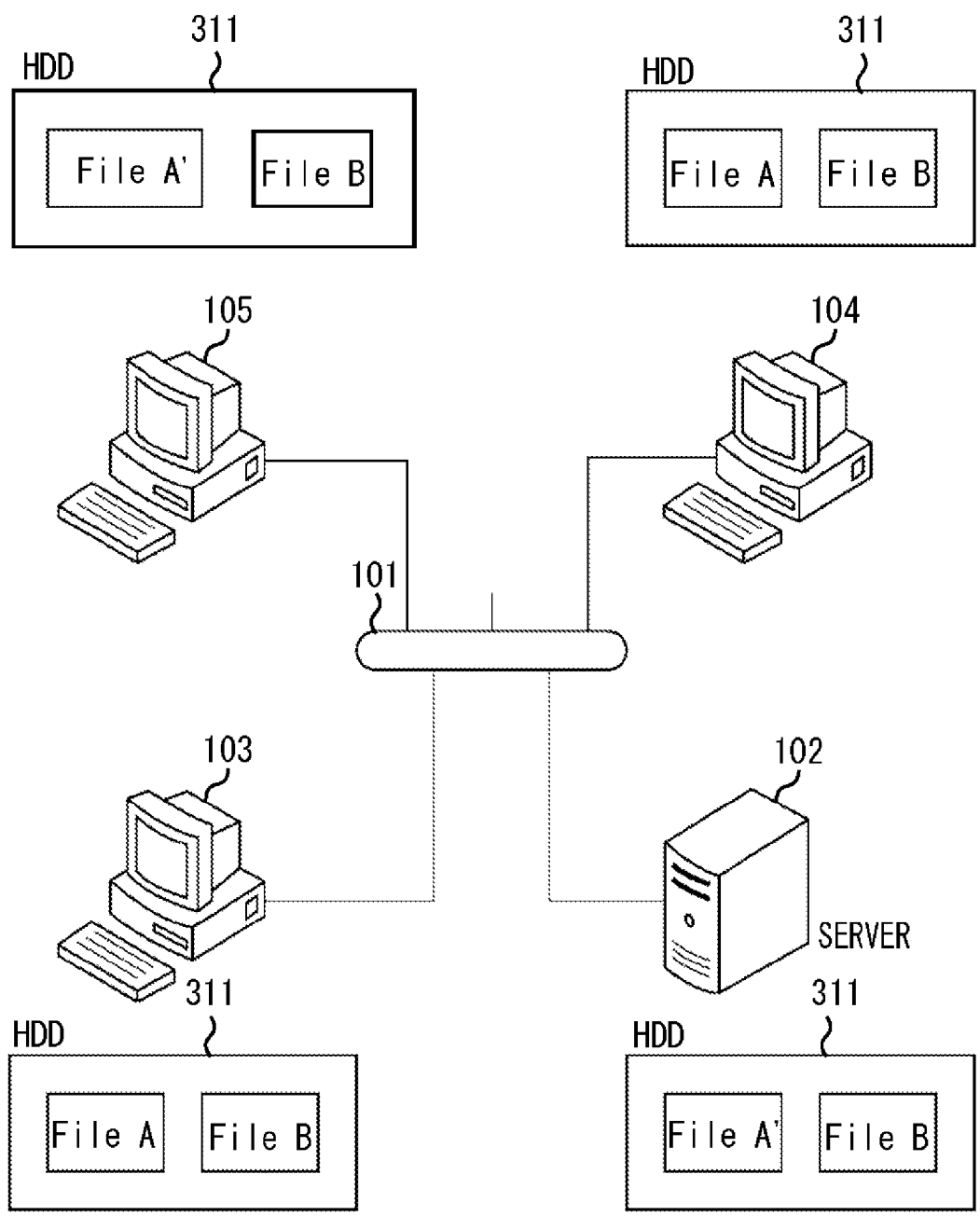
FIG. 2 is a configuration view when a client in a file sharing system (a file synchronization system) according to an exemplary embodiment of the present invention is in an online state, where an information processing apparatus and a client are connected.

FIG. 1 is a configuration view of a file sharing system (a file synchronization system) according to an exemplary embodiment of the present invention, where an information processing apparatus, serving as a server, and an information processing apparatus, serving as a client, are connected, and a part of clients is in an offline mode. FIG. 2 is a configuration view of the file sharing system indicating that the client in the offline state shifts to an online state.

The file sharing system is configured with a server client system. A server 102 and a plurality of clients 103 to 105 are connected via a network 101. The server 102 shares and synchronizes a file with the plurality of clients 103 to 105.

The server 102 has a normal operation mode for approving access to a hard disk, a first sleep mode for restricting access to a hard disk for power saving purpose but approving access to a RAM, and a second sleep mode for restricting access to both the hard disk and the RAM for power saving purpose.

In the server 102, power is supplied to both the hard disk and the RAM in the normal operation mode, power supply to the hard disk is restricted in the first sleep mode, and power supply to both the hard disk and the RAM is restricted in the second sleep mode.

The server 102 and the clients 103 to 105 each store a file in an HDD 311.

Referring to the example illustrated in FIG. 1, the client 105 is in the offline state. The offline state means that the client 105 is not connected physically or logically with the network 101. The offline state also includes a case where software for implementing the file sharing system does not operate on the client 105 although the client 105 is connected physically or logically with the network 101. Further, the offline state also includes a case where the operating state of the software is in a mode which does not communicate with the server 102. The server 102 and the clients 103 and 104 each store a file A and a file B in the HDD 311. The client 105 stores a file A', which is an updated version of the file A, in the HDD 311. The file A' has an update date and time (time stamp) later than that of the file A.

If the client 105 shifts to the online mode as FIG. 1 to FIG. 2, the client 105 accesses the server 102 and searches whether there is a file which the client 105 does not have or a file having a time stamp later than that of the corresponding file of the client 105 in the server 102.

As a result of the search, if there is such a file in the HDD 311 of the server 102, the client 105 reflects it in the HDD 311 thereof. In the example illustrated in FIG. 1, the clients 105 copies a file B, which does not exist in the HDD 311 of the client 105, from the HDD 311 of the server 102 and reflects the file B in the HDD 311 of the client 105.

Further, the client 105 accesses the server 102 when the client 105 shifts to the online state and searches whether there is a file which the client 105 has in the HDD 311 of the server 102. Further, the client 105 searches whether there is a file having a time stamp older than that of the corresponding file which the client 105 has in the HDD 311 of the server 102.

As a result of the search, if there is such a file in the HDD 311 of the server 102, the client 105 reflects the content of a file existing in the HDD 311 of the client 105 in the HDD 311 of the server 102. In the example illustrated in FIG. 1, a time stamp of the file A existing in the HDD 311 of the server 102 is older than that of the file A' existing in the HDD 311 of the client 105. Thus, the client 105 transmits the file A' to the server 102 to reflect the content of the HDD 311 of the client 105 in the HDD 311 of the server 102.

The aforementioned processing is not executed only when the clients 103 to 105 shift from the offline state to the online state, but is executed periodically. With this operation, the content in the HDD 311 of the server 102 can be always the newest one. By referring to the newest file, a plurality of clients 103 to 105, which configure the file sharing system, can synchronize the file.

Figure 3:
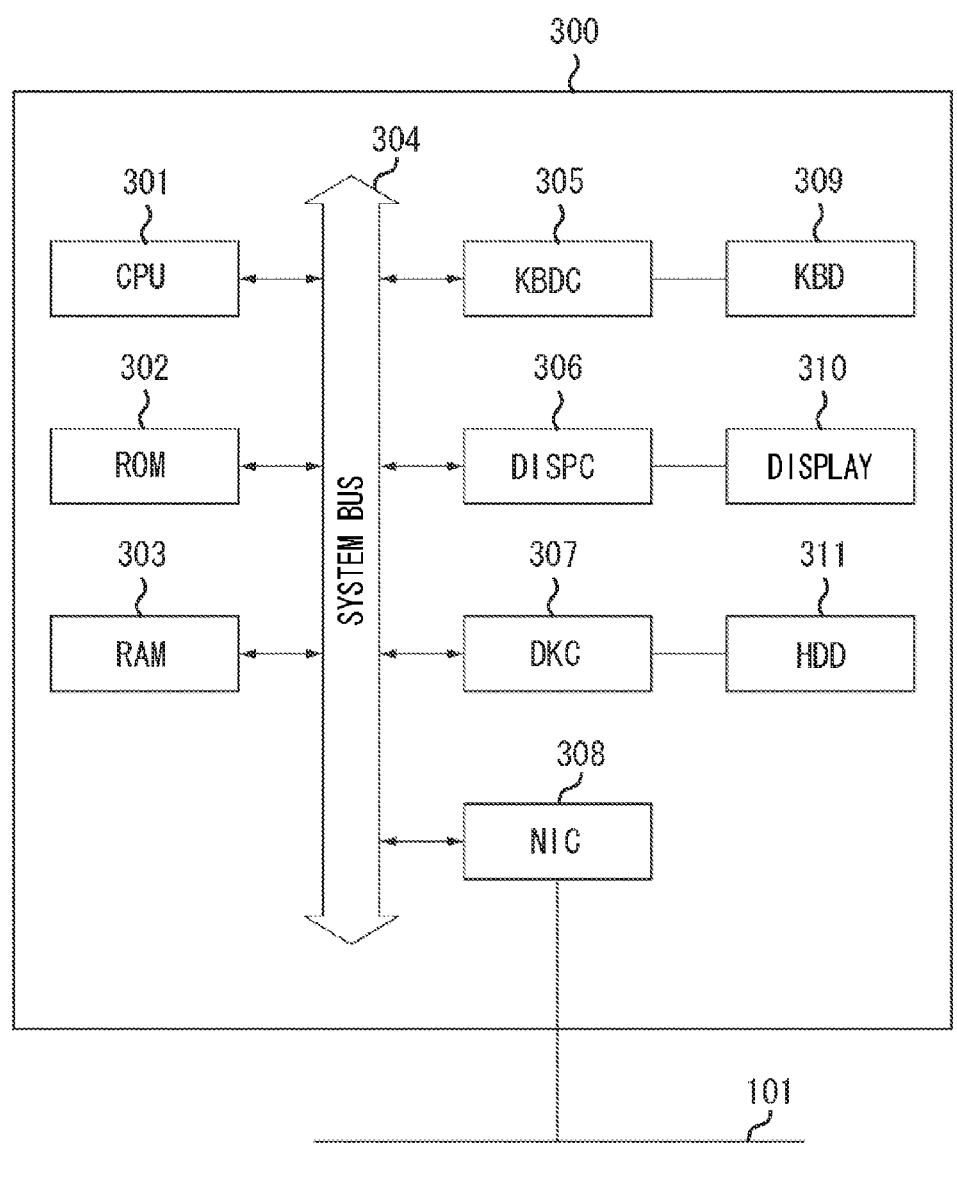
FIG. 3 is a block diagram illustrating an example of an internal configuration of a client or a server illustrated in FIG. 1.

FIG. 3 is a block diagram illustrating an example of an internal configuration of a client or a server illustrated in FIG. 1. In the present exemplary embodiment, the clients 103 to 105 and the server 102 basically have a similar internal configuration although having a slight difference in specifications. Thus, the clients 103 to 105 and the server 102 are presumed to have the configuration illustrated in FIG. 3.

Referring to the example illustrated in FIG. 3, an information processing apparatus (a general term including the clients 103 to 105 and the server 102) 300 includes a central processing unit (CPU) 301, which executes software stored in a read-only memory (ROM) 302 or a large-scale storage device (HDD) 311. The CPU 301 collectively controls each device connected with a system bus 304.

A random access memory (RAM) 303 functions as a main memory or a work area of the CPU 301. A keyboard controller (KBDC) 305 controls an instruction input from a keyboard (KBD) 309 provided on the PC 300.

A display controller (DISPC) 306 controls displaying of a display 310, for example, a liquid crystal display. A disk controller (DKC) 307 controls the HDD 311 as a large-scale storage device. A network interface card (NIC) 308 communicates data with other devices in both directions via the network (local area network (LAN)) 101.

Figure 4A:
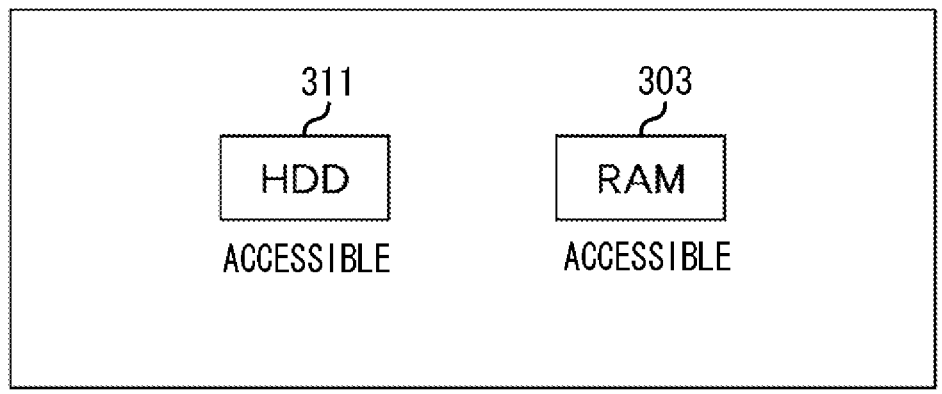
FIGS. 4A to 4C illustrate operation modes of a server illustrated in FIG. 1.
Figure 4B:
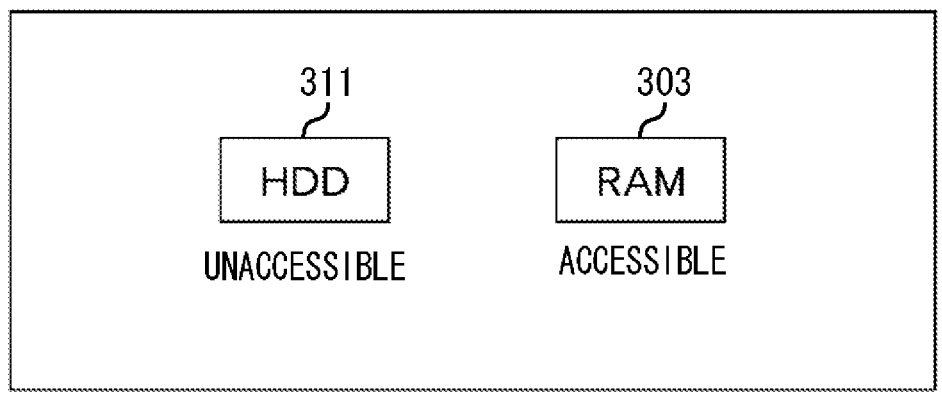
Figure 4C:
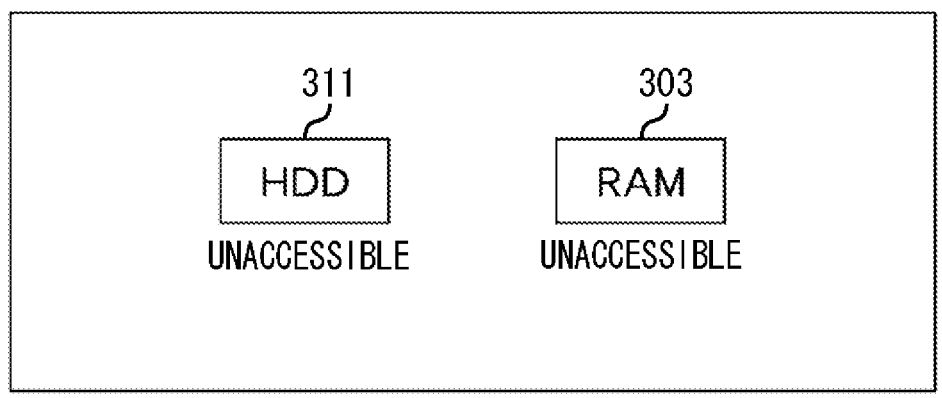

FIGS. 4A to 4C illustrate operation modes of the server 102 illustrated in FIG. 1.

The server 102 includes three modes, which are a normal operation mode, a sleep mode 1, and a sleep mode 2.

As illustrated in FIG. 4A, when the server 102 is operating normally, power is supplied to each device in the server 102, and the HDD 311 and the RAM 303 are also operating.

As illustrated in FIG. 4B, when the server 102 is operating in the sleep mode 1, power is not supplied (or is restricted) to the DKC 307 and the DISPC 306. Therefore, the HDD 311 is not operating during the sleep mode 1, so that data cannot be read and written in the HDD 311.

As illustrated in FIG. 4C, when the server 102 is operating in the sleep mode 2, power is not supplied (or is restricted) to the DKC 307, the DISPC 306, and the RAM 303. Therefore, data cannot be read and written to the RAM 303 during the sleep mode 2, in addition to the state in the sleep mode 1.

The sleep mode 1 has lower power consumption than the normal operation mode, and the sleep mode 2 has further lower power consumption than the sleep mode 1.

If there is no access from outside for a predetermined time, the server 102 shifts to the sleep mode 1. Further, it may be added as a condition for shifting the server 102 to the sleep mode 1 that there is no operation on the server 102 for a predetermined time. Further, when the server 102 is not accessed from outside for a predetermined time and there are no clients on the network 101, the server 102 shifts to the sleep mode 2.

Figure 5:
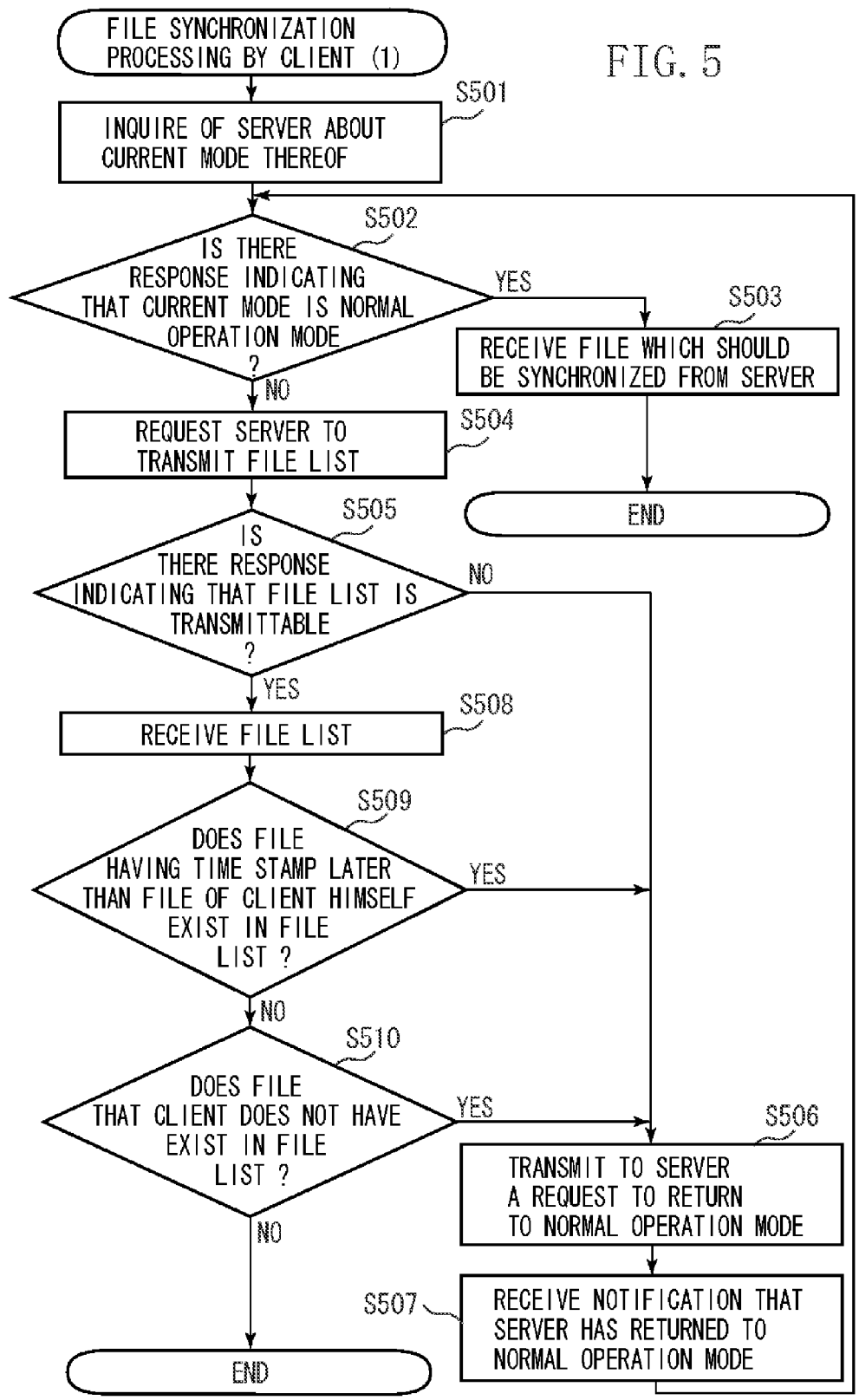
FIG. 5 is a flowchart illustrating steps of file synchronization processing with a server, which are executed by a client illustrated in FIG. 1.

FIG. 5 is a flowchart illustrating file synchronization processing with the server 102, which is executed by the client 103 illustrated in FIG. 1.

In step S501, the client 103 inquires of the server 102 about the current mode thereof via the network 101. In step S502, the client 103 determines whether there is a response indicating that the server 102 is in the normal operation mode. If there is a response indicating that the server 102 is in the normal operation mode (YES in step S502), the client 103 determines that the server 102 is in the normal operation mode, and processing proceeds to step S503.

In step S503, the client 103 receives a file list (a table of files) from the server 102. After referring to the file list, if there is a file which is not stored in the HDD 311 of the client 103 of a file having a time stamp later than that of the corresponding file of the client 103 in the files stored in the HDD 311 of the server 102, the client 103 requests acquisition of such a file. Further, the client 103 receives the file from the server 102 and stores it in the HDD 311 of the client 103, and then processing ends.

In step S502, when there is no response indicating that the server 102 is in the normal operation mode for a predetermined time (NO in step S502), the client 103 determines that the server 102 is in the sleep mode 1 or the sleep mode 2, and processing proceeds to step S504.

In step S504, the client 103 requests the server 102 to transmit a file list stored in the RAM 303 of the server 102 via the network 101. The file list will be described below with reference to FIG. 7.

In step S505, the client 103 determines whether there is a response indicating that the file list is transmittable from the server 102. When there is the response indicating that the file list is transmittable from the server 102 (YES in step S505), the client 103 determines that the server 102 is in the sleep mode 1, and processing proceeds to step S508.

In step S505, when there is no response indicating that the file list is transmittable for a predetermined time (NO in step S505), the client 103 determines that the server 102 is in the sleep mode 2, and processing proceeds to step S506.

In step S506, the client 103 requests the server 102 to return to the normal operation mode. In step S507, the client 103 receives a notification from the server 102 that the server 102 has returned to the normal operation mode. Then, in step S502, the client 103 inquires of the server 102 again about the current operation mode thereof via the network 101.

In step S508, the client 103 receives the file list stored in the RAM 303 of the server 102.

In step S509, the client 103 determines whether the server 102 has a file having a time stamp later than that of the corresponding file of the client 103.

In step S509, when the server 102 has a file having a time stamp later than that of the corresponding file of the client 103 (YES in step S509), then in step S506, the client 103 transmits a request to the server 102 to return to the normal operation mode.

In step S507, when the client 103 receives a notification that the server 102 has returned to the normal operation mode, then in step S502, the client 103 inquires of the server 102 again about the current operation mode thereof via the network 101.

In step S509, when the server 102 does not have a file having a time stamp later than that of the corresponding file of the client 103 (NO in step S509), then in step S510, the client 103 determines whether the server 102 has a file that the client 103 does not have.

In step S510, when the server 102 has a file that the client 103 does not have (YES in step S510), then in step S506, the client 103 requests the server 102 to return to the normal operation mode.

When the client 103 receives a notification that the server 102 has returned to the normal operation mode in step S507, then in step S502, the client 103 inquires of the server 102 again about the current operation mode thereof via the network 101.

In step S510, when the server 102 does not have a file that the client 103 does not have (NO in step S510), processing ends.

Figure 6:
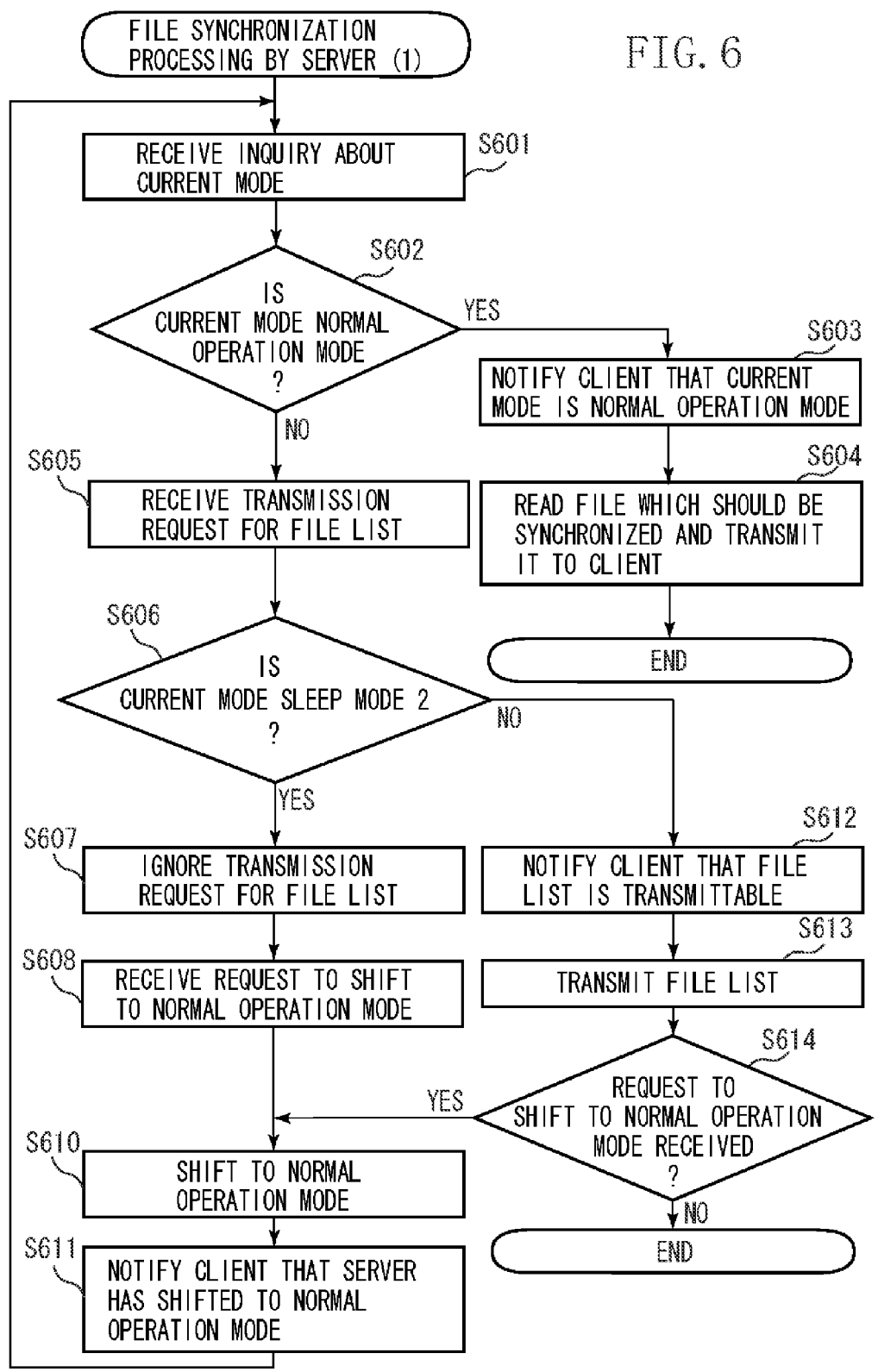
FIG. 6 is a flowchart illustrating processing steps by a server in synchronizing processing with a client.

FIG. 6 is a flowchart illustrating processing steps by the server 102 in synchronization processing with the client 103. The flowchart in FIG. 6 illustrates processing on the server 102 side with respect to the processing of FIG. 5, which the client 103 executes in the synchronization processing.

In step S601, the server 102 receives an inquiry about the current operation mode (step S501 of FIG. 5) from the client 103.

In step S602, the server 102 determines whether the server 102 is in the normal operation mode. In step S603, when the server 102 is in the normal operation mode (YES in step S602), then in step S103, the server 102 notifies the client 103 that the server 102 is in the normal operation mode. In step S604, the server 102 reads a file which should be synchronized from the HDD 311 based on receiving an acquisition request of a file from the client 103, transmits the file to the client 103, and then processing ends.

When the server 102 is not in the normal operation mode (NO in step S602), the server 102 notifies the client 103 that the server 102 is not in the normal operation mode or informs the client 103 that the server 102 is not in the normal operation mode by notifying nothing.

In step S605, the server 102 receives a transmission request for a file list 701 (in FIG. 7) stored in the RAM 303 from the client 103 (step S504 in FIG. 5).

In step S606, the server 102 determines whether the server 102 is in the sleep mode 2.

In step S606, when the server 102 is in the sleep mode 2 (YES in step S606), then in step S607, the server 102 ignores the transmission request for the file list 701 and does not respond anything to the client 103.

Then, in step S608, the server 102 receives a request to shift to the normal operation mode (step S506 of FIG. 5) from the client 103.

Then, the server 102 shifts to the normal operation mode in step S610, notifies the client 103 that the server 102 has shifted to the normal operation mode in step S611, and receives an access request to the HDD 311 from the client 103 in step S601.

In step S606, when the server 102 is operating in the sleep mode 1 (NO in step S606), the server 102 notifies the client 103 that the file list is transmittable. In step S613, the server 102 reads the file list 701 stored in the RAM 303 and transmits the file list 701 to the client 103.

In step S614, the server 102 determines whether the server 102 has received a request to shift to the normal operation mode from the client 103. When the server 102 has not received the request (NO in step S614), processing ends. When the server 102 has received the request (YES in step S614), then in step S610, the server 102 shifts to the normal operation mode.

According to the operations illustrated in the flow charts in FIGS. 5 and 6, when the server 102 is in the sleep mode 1 and there is no difference between the files stored in the client 103 and the server 102, the server 102 does not need to shift to the normal operation mode. Therefore, it can be suppressed to shift the server 102 from the power saving mode to the normal operation mode, and thus the power consumption of the server 102 can be reduced. In addition, since the processing required for synchronizing the client 103 and the server 102 can be executed, the processing in the whole file sharing system can be prevented from being delayed.

FIG. 7 illustrates an example of a file list stored in the RAM 303 and the HDD 311 of the server 102 illustrated in FIG. 1.

The server 102 stores the file list 701 in the RAM 303 and the HDD 311. In the normal operation mode, the file lists stored in the RAM 303 and the HDD 311 constantly have the same value. The RAM 303 may constantly store the same information as the file list stored in the HDD 311 regardless of the operation mode of the server 102. It may be also possible that the RAM 303 does not store the file list when the server 102 is in the normal operation mode but stores a copy of the file list from the HDD 311 when the server 102 shifts from the normal operation mode to the sleep mode 1.

In the file list 701, a file name and a time stamp (a date and time of creation or a date and time of updating) of a target file to be synchronized using the system are written among files stored in the HDD 311 of the server 102.

When the server 102 updates, deletes, or newly creates a file stored in the HDD 311, the server 102 updates the file list 701 stored in the RAM 303 and the HDD 311.

The file list 701 may have a hash value generated from a file and information such as an identification (ID) for uniquely identifying a file.

Figure 8:
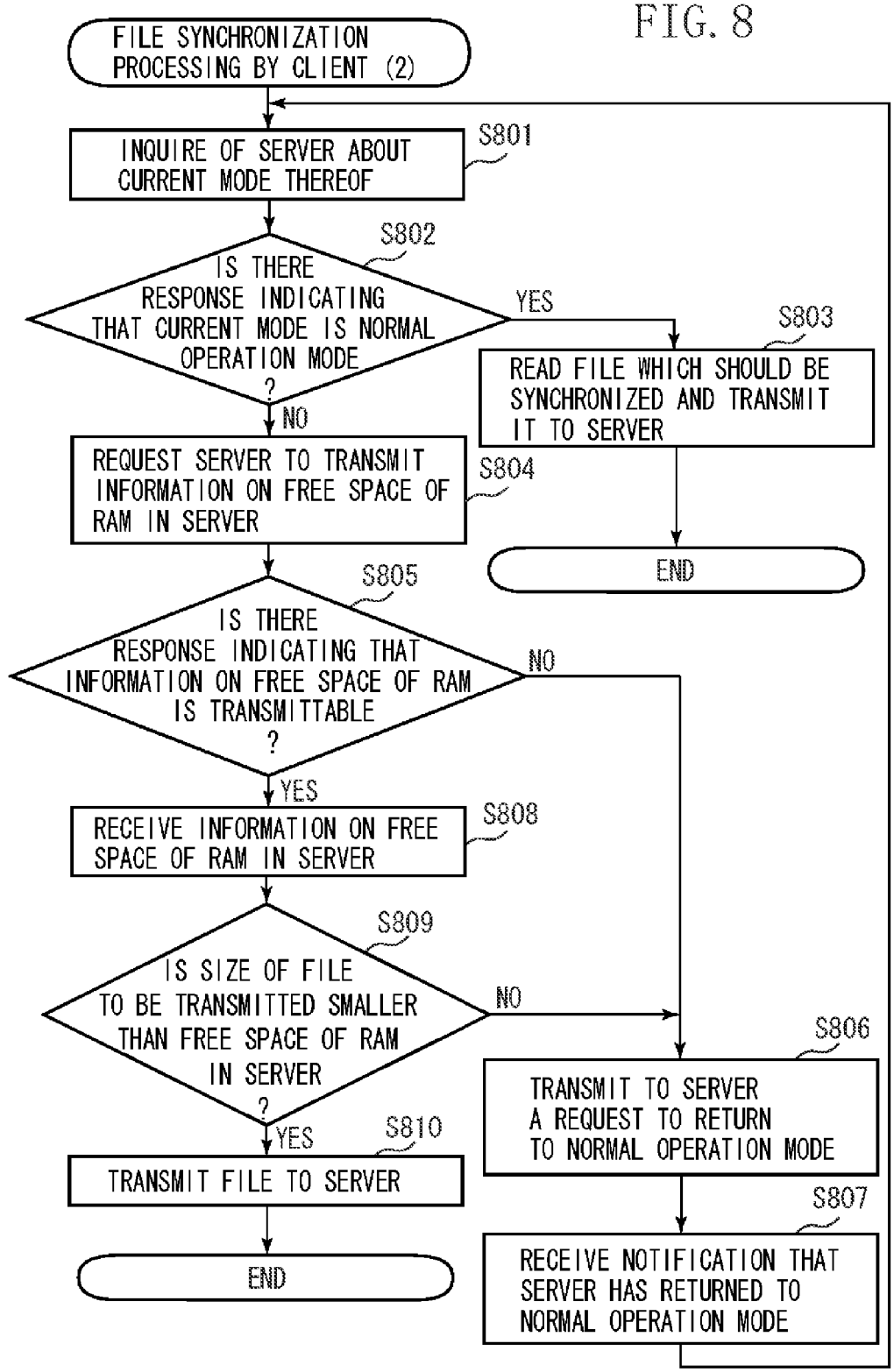
FIG. 8 is a flowchart illustrating steps of file synchronization processing with a server, which are executed by a client illustrated in FIG. 1.

FIG. 8 is a flowchart illustrating a procedure of file synchronization processing with the server 102, which is executed by the client 103 illustrated in FIG. 1. FIG. 5 illustrates the processing in which the client 103 receives a file from the server 102 in the synchronization processing, but FIG. 8 illustrates processing in which the client 103 transmits a file to the server 102. In the synchronization processing between the client 103 and the server 102, the client 103 executes the processing illustrated in the flowchart of FIG. 5 and the processing illustrated in the flowchart of FIG. 8.

In step S801, the client 103 inquires of the server 102 about the current operation mode thereof via the network 101.

In step S802, the client 103 determines whether there is a response from the server 102 indicating that current mode is the normal operation mode. When there is a response from the server 102 indicating that the current mode is the normal operation mode (YES in step S802), the client 103 determines that the server 102 is in the normal operation mode, and processing proceeds to step S803.

In step S803, the client 103 writes a file in the HDD 311 of the server 102, and processing ends. At this time, the client 103 receives a file list from the server 102. After referring to the file list, the client 103 searches the target files to be synchronized stored in the client 103 whether there is a file that is not stored in the HDD 311 of the server 102. When there is the file not stored in the HDD 311 of the server 102, the client 103 transmits the file to the server 102. When there is a file having a time stamp older than that of the corresponding file of the client 103, the client 103 transmits the file to the server 102.

When there is no response indicating that the server 102 is in the normal operation mode for a predetermined time in step S802 (NO in step S802), the client 103 determines that the server 102 is in the sleep mode 1 or the sleep mode 2, and processing proceeds to step S804.

In step S804, the client 103 requests the server 102 to notify information on a free space of the RAM 303 via the network 101.

In step S805, the client 103 determines whether there is a notification on a free space in the RAM 303 from the server 102. When the client 103 detects that the information on a free space of the RAM 303 is not notified from the server 102 for a predetermined time (NO in step S805), the client 103 determines that the server 102 is in the sleep mode 2, and processing proceeds to step S806.

In step S806, the client 103 transmits a request to the server 102 to return to the normal operation mode.

In step S807, when the client 103 receives a notification that the server 102 has returned to the normal operation mode, then in step S801, the client 103 inquires of the server 102 again about the current operation mode thereof via the network 101.

When the server 102 notifies the information on a free space of the RAM 303 in step S805 (YES in step S805), the client 103 determines that the server 102 is in the sleep mode 1, and processing proceeds to step S808.

In step S808, the client 103 receives the information on a free space of the RAM 303 from the server 102.

In step S809, the client 103 compares the free space in the RAM 303 and the size of a file to be transmitted to the server 102 for the synchronization processing.

When the size of the file to be transmitted is smaller than the free space in the RAM 303 (YES in step S809), then in step S810, the client 103 transmits the file to the server 102, and processing ends. In this case, the file synchronization processing can be executed without returning the server 102 to the normal operation mode.

When the size of the file to be transmitted is larger than the free space of the RAM 303 (NO in step S809), then in step S806, the client 103 requests the server 102 to return to the normal operation.

When the client 103 receives the notification that the server 102 has returned to the normal operation mode in step S807, then in step S801, the client 103 inquires of the server 102 again about the current operation mode thereof via the network 101.

Figure 9:
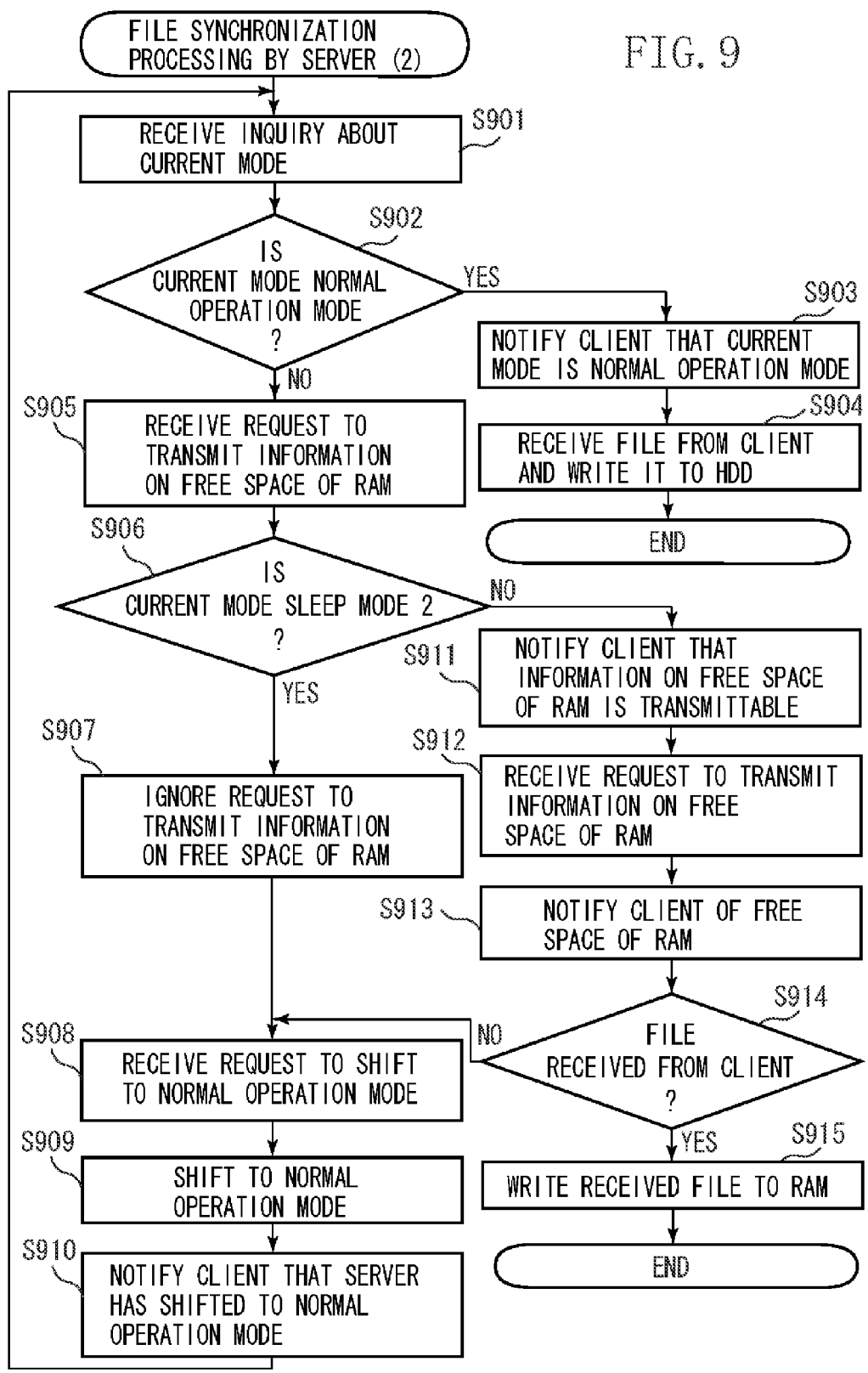
FIG. 9 is a flowchart illustrating processing steps by a server in synchronizing processing with a client.

FIG. 9 is a flowchart illustrating processing steps by the server 102 in the synchronization processing with the client 103. The flowchart in FIG. 9 illustrates the processing on the server 102 side with respect to the processing of FIG. 8, which is executed by the client 103 in the synchronization processing. FIG. 6 illustrates the processing in which the server 102 in the synchronization processing transmits a file to the client 103, but FIG. 9 illustrates processing in which the server 102 receives a file from the client 103. In the synchronization processing between the client 103 and the server 102, the server 102 executes the processing illustrated in the flowchart of FIG. 6 and the processing illustrated in the flowchart of FIG. 9.

In step S901, the server 102 receives an inquiry about the current operation mode (step S801 in FIG. 8) from the client 103.

In step S902, the server 102 determines whether the current operation mode is the normal operation mode. In step S903, when the server 102 is in the normal operation mode (YES in step S902), the server 102 notifies the client 103 that the server 102 is in the normal operation mode. In step S904, the server 102 receives a file transmitted from the client 103 (step S803 in FIG. 8) and writes the file in the HDD 311, and processing ends.

In step S905, the server 102 receives a request to transmit information on a free space of the RAM 303 (step S804 in FIG. 8) from the client 103.

In step S906, the server 102 determines whether the current mode is the sleep mode 2. When the server 102 is operating in the sleep mode 2 (YES in step S906), then in step S907, the server 102 ignores the request to transmit the information on a free space of the RAM 303.

When the server 102 receives a request from the client 103 to shift to the normal operation mode (step S806 in FIG. 8) in step S908, then in step S909, the server 102 shifts to the normal operation mode.

In step S910, the server 102 notifies the client 103 that the server 102 has shifted to the normal operation mode, and processing proceeds to step S901.

On the other hand, when the server 102 is operating in the sleep mode 1 (NO in step S906), then in step S911, the server 102 notifies the client 103 that the information on a free space of the RAM 303 is transmittable. Then, in step S912, the server 102 receives a request to transmit the information on a free space of the RAM 303 (step S804 in FIG. 8) from the client 103.

In step S913, the server 102 notifies the information on a free space of RAM 303 to the client 103.

In step S914, the server 102 determines whether a file has received from the client 103. When the server 102 does not receive the file (NO in step S914), then in step S908, the server 102 waits to receive a request to shift to the normal operation mode. When the server 102 receives the file (YES in step S914), then in step S915, the server 102 receives writing to the RAM 303 and writes the file to the RAM 303, and then processing ends.

According to the operations described with reference to FIGS. 8 and 9, when the client 103 writes a file having a size smaller than a free space of the RAM of the server 102 when the server 102 is operating in the sleep mode 1, the server 102 does not need to shift to the normal operation mode. Therefore, it can be suppressed to shift the server 102 from the power saving mode to the normal operation mode, and thus the power consumption of the server 102 can be reduced. In addition to this effect, since synchronization processing that is sufficient to receive with the capacity of the RAM 303 can be executed, the processing of the whole file sharing system can be prevented from being delayed.

The present invention can be attained by supplying directly, indirectly, or remotely a program for implementing each function of the aforementioned exemplary embodiment to a system or a device, reading the supplied program code by a computer or an image processing apparatus included in the system, and executing the program.

Therefore, in order to implement the functions and processing of the exemplary embodiment of the present invention by a computer or the aforementioned device, the present invention includes program code of a control program installed in the computer and a storage medium for storing the program code.

As for a recording medium for supplying a program, a floppy disk, a hard disk, an optical disk, a magneto-optical disk, a compact disc read-only memory (CD-ROM), a compact disc recordable (CD-R), and a compact disc rewritable (CD-RW), can be used. Further, as for the recording medium, a magnetic tape, a non-volatile memory card, a read-only memory (ROM), a digital versatile disc (DVD) (a digital versatile disc read-only memory (DVD-ROM), a digital versatile disc recordable (DVD-R)), and a universal serial bus (USB) memory can be used.

Further, the functions of the exemplary embodiment can be executed by executing the program read by a computer. In addition, an operating system (OS) operating on a computer can execute a part or the whole of actual processing based on the instruction of the program. In this case, the functions of the aforementioned exemplary embodiment can also be implemented.

Furthermore, a program read from a recording medium can be written in a memory of a function expansion board inserted in a computer or a function expansion unit connected a computer. Then, a central processing unit (CPU) provided in the function expansion board or the function expansion unit can execute a part or the whole of actual processing based on the instruction of the program. In this way, the functions of the aforementioned exemplary embodiment can also be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-145847 filed Jun. 3, 2008, which is hereby incorporated by reference herein in its entirety.

What is claimed is:

1. An apparatus comprising:
   a first storing unit configured to store a plurality of files;
   a second storing unit configured to store file information indicating a list of the plurality of files;
   a receiving unit configured to receive a data acquisition request from a client apparatus;
   a first reading unit configured to read a file from the first storing unit in response to the data acquisition request received by the receiving unit when the apparatus operates in a first mode and the received data acquisition request is a request for acquiring the file, wherein in the first mode, power is supplied to the first storing unit and the second storing unit;
   a second reading unit configured to read the file information from the second storing unit in response to the data acquisition request received by the receiving unit when the apparatus operates in a second mode and the received data acquisition request is a request for acquiring the file information, wherein in the second mode, power is supplied to the second storing unit, and power supply to the first storing unit is restricted; and
   a transmission unit configured to transmit one of the file read by the first reading unit and the file information read by the second reading unit to the client apparatus.

2. The apparatus according to claim 1,
   wherein the apparatus shift to a third mode when the apparatus is not accessed from the client apparatus for predetermined time,
   wherein the third mode restricts power supply to the first storing unit and the second storing unit, and
   wherein if the receiving unit receives the data acquisition request from the client apparatus when the apparatus is in the third mode, both the first reading unit and the second reading unit do not read data.

3. The apparatus according to claim 1, further comprising an updating unit configured to update the file information if the file stored in the first storing unit is updated.

4. The apparatus according to claim 1 further comprising:
   a first writing unit configured to write da file transmitted from the client apparatus to the storage unit when the apparatus is in the first mode; and
   a second writing unit configured to write a file transmitted from the client apparatus to the random access memory when the apparatus is in the second mode.

5. A method for controlling an apparatus comprising a fist storing unit which stores a plurality of files and a second storing unit which stores file information indicating a list of the plurality of files, the method comprising:
- receiving a data acquisition request from a client apparatus;
- reading a file from the first storing unit in response to receiving the data acquisition request from the client apparatus when the apparatus the apparatus operates in a first mode and the received data acquisition request is a request for acquiring the file, wherein in the first mode, power is supplied to the first storing unit and the second storing unit, and reading the file information from the second storing unit in response to receiving the data acquisition request from the client apparatus when the apparatus operates in a second mode and the received data acquisition request is a request for acquiring the file information, wherein in the second mode, power is supplied to the second storing unit, and power supply to the first storing unit is restricted; and
- transmitting one of the file read from the first storing unit and the file information read from the second storing unit to the client apparatus.

* * * * *